United States Patent [19]

Lehmann et al.

[11] Patent Number: 5,393,290
[45] Date of Patent: Feb. 28, 1995

[54] ROLL WITH ADJUSTABLE DEFLECTION

[75] Inventors: Rolf Lehmann, Rudolfstetten; Eugen Schnyder, Waltenschwil, both of Switzerland

[73] Assignee: Sulzer-Escher Wyss GmbH, Ravensburg, Germany

[21] Appl. No.: 966,161
[22] PCT Filed: Apr. 30, 1992
[86] PCT No.: PCT/EP92/00947
§ 371 Date: Dec. 21, 1992
§ 102(e) Date: Dec. 21, 1992
[87] PCT Pub. No.: WO92/19809
PCT Pub. Date: Nov. 12, 1992

[30] Foreign Application Priority Data

May 3, 1991 [CH] Switzerland ............. 01330/91-7
Aug. 8, 1991 [DE] Germany .................. 4126232

[51] Int. Cl.⁶ ........................................... B23P 15/00
[52] U.S. Cl. ............................... 492/16; 492/7; 492/70; 492/54
[58] Field of Search ........... 492/2, 3, 7, 17, 18, 492/20, 46, 49, 51–53, 54, 56

[56] References Cited

U.S. PATENT DOCUMENTS

| | | | |
|---|---|---|---|
| 3,618,190 | 11/1971 | Vernazza et al. | 492/20 |
| 3,937,246 | 6/1975 | Salo et al. | |
| 4,099,487 | 7/1978 | Wouters | 492/18 |
| 4,233,011 | 11/1980 | Bolender et al. | 492/20 |
| 4,498,383 | 2/1985 | Pav et al. | 492/7 |
| 4,518,460 | 5/1985 | Hauser et al. | 492/7 |
| 4,614,565 | 9/1986 | Riihinen | 492/7 |
| 4,637,109 | 1/1987 | Bryer | 492/7 |
| 4,821,384 | 4/1989 | Arav | 492/7 |
| 4,850,088 | 7/1989 | Speak | 492/7 |
| 4,870,731 | 10/1989 | Yano | 492/56 |
| 4,888,464 | 12/1989 | Shibata et al. | 492/54 |
| 4,998,333 | 3/1991 | Skyttä | 492/20 |
| 5,111,565 | 5/1992 | Beaudreault et al | 492/7 |
| 5,111,567 | 5/1992 | Leino et al. | 492/54 |
| 5,189,775 | 3/1993 | Seifert | 492/7 |

FOREIGN PATENT DOCUMENTS

| | | | |
|---|---|---|---|
| 2002794 | 5/1990 | Canada | 492/16 |
| 2522657 | 11/1976 | Germany . | |
| 3937246 | 5/1990 | Germany . | |

*Primary Examiner*—Irene Cuda
*Attorney, Agent, or Firm*—Townsend and Townsend Khourie and Crew

[57] ABSTRACT

A roll for the thermal treatment of a web of material (4) in which the web of material (4) is cooled to a defined predetermined temperature in a gap (5) between the roll (1) and a counter-roll (2) is formed as a deflection controlled roll with a rotationally fixed carrier (8) and a rotatable roll jacket (10) which is supported relative to the latter with support elements (11). The roll jacket consists of a plurality of concentric zones, an inner soft zone (16) and a thin outer zone (17) with good thermal conductivity, for example of metal. The roll surface (22) is for example cooled with cooling gas nozzles which are regulated by a temperature sensor (20) so that the roll temperature in the gap (5) adopts a defined temperature value. A roll of this kind is for example suitable for use in a calender for the smoothing of a paper web or also for the processing or manufacture of a plastic foil.

20 Claims, 1 Drawing Sheet

ROLL WITH ADJUSTABLE DEFLECTION

BACKGROUND OF THE INVENTION

The invention relates to a roll with a rotationally fixed carrier and a roll jacket which is rotatable about the carrier and supported relative to the carrier by at least one support element exerting a supporting force in a pressing plane, the roll jacket being built up of a plurality of several concentric zones of different characteristics, and to the use of the roll for cooling or heating purposes.

Such so-called deflection controlled rolls equipped with support elements of controllable support force and having a multi-layered roll jacket are for example known from DE 35 25 950 and are used for the thermal treatment of webs of material. In this arrangement, the individual layers of the roll jacket have differing physical, and in particular thermal, characteristics.

As a rule, the inner zone of the roll jacket consists of a hard material, for example metal, and the outer zone of a soft material, for example an elastomer such as soft caoutchouc or the like. Such deflection controlled rolls with roll jackets of this known kind are however only conditionally suited for some uses, for example for the thermal treatment of a paper web in a smoothing calender or for the thermal treatment or manufacture of a plastic foil. It is in particular a disadvantage that the outer zone has a poor thermal conductivity so that good thermal dissipation is not guaranteed and the temperature can only be kept inadequately constant during the treatment of the web of material.

The use of deflection controlled rolls for plastic foil pouring plants is for example known from DE-A-33 00 251. In this arrangement the flowable plastic composition is directed between two rolls and is brought to a desired thickness profile during solidification by means of the controllable support force of the support elements of the deflection controlled roll. Such deflection controlled rolls with roll jackets of the known kind are however only poorly suited for certain plastics which exhibit a relatively sudden transition between the flowable and the solid state in a narrow temperature range. On the one hand, with such rapidly solidifying plastics, for example polyethylene, the pressing and thickness control processes must take place at a precisely determined time point at a temperature which is as exact as possible, which is not required to the same degree with thermoplastics with a larger solidification range. On the other hand, rapidly solidifying plastics tend to stick during the solidification process to the customary roll surfaces.

SUMMARY OF THE INVENTION

The object underlying the invention is to remove the above-mentioned disadvantages of the prior art, and in particular to provide a roll with controllable support force which makes it possible to keep the temperature in a roll gap in a narrow tolerance range and thus to improve an ideal thermal treatment of the webs of material and also to improve the manufacture of plastic foils from rapidly solidifying plastics.

This object is satisfied in accordance with the invention essentially in that the roll jacket has a load carrying inner zone of elastically deformable material and also a non-load carrying outer zone which has a good thermal conductivity and a thickness of up to 1 mm.

Through the selected combination of layers of specific characteristics and thicknesses, it is on the one hand possible to exploit the advantages of a deflection controlled roll in its entirety and, on the other hand, to ensure a sensitive and exact temperature control in the roll gap since the thermal capacity of the outer zone can be accurately predetermined through the choice of the material and the thickness dimension and no disturbing influence is present through the inner zone.

Moreover, through this construction it is possible to achieve a reduction of the mass of the roll jacket in comparison to metal rolls, and therewith an improvement of the dynamic characteristics such as, for example, the vibration damping. It is furthermore of particular advantage that the danger of damage or destruction of the thin and hard outer layer on the occurrence of local loads in the form of point loads or line loads is removed by the selected combination of zones of different characteristics. The ratio of the hardnesses, modulus of elasticity and layer thicknesses is for this purpose so selected, with respect to the individual zones or regions, that with a predetermined level of loading and type of loading, the respective outer and respective harder layer of the zone assembly is supported by the lower lying layer in such a form that neither the permissible stresses nor the permissible strains in the harder layer are exceeded.

The outer zone with the largest possible thermal conductivity can be formed by the outermost layer itself; however is also possible to form a zone disposed beneath the outermost layer of a different material of higher thermal conductivity, for example copper or silver, with the thicker zone having a very much lower thermal conductivity adjoining this layer radially inwardly and preferably consisting of two concentric regions with the radially outer region having in each case a greater modulus of elasticity. The radially outer region can thereby consist of a duromer/plastomer with a modulus of elasticity of approximately $10^3$ to $10^4$ $N/mm^2$, whereas the radially inner region can consist of a plastomer/elastomer and the modulus of elasticity is there preferably disposed in the range of 10 to $1,5 \times 10^5$ $N/mm^2$.

On using specific support element types, it is expedient to provide additional thin and firm running surfaces, for example of metal, as the innermost zone within the rubber-elastic radially inner region, for the bearing surfaces of the support elements.

It is particularly advantageous to use the roll of the invention for the cooling or heating of webs of material such as paper webs, laminated webs, of paper webs laminated with foil, and for the manufacture of foils.

DESCRIPTION OF THE PREFERRED EMBODIMENTS

Figure 1:
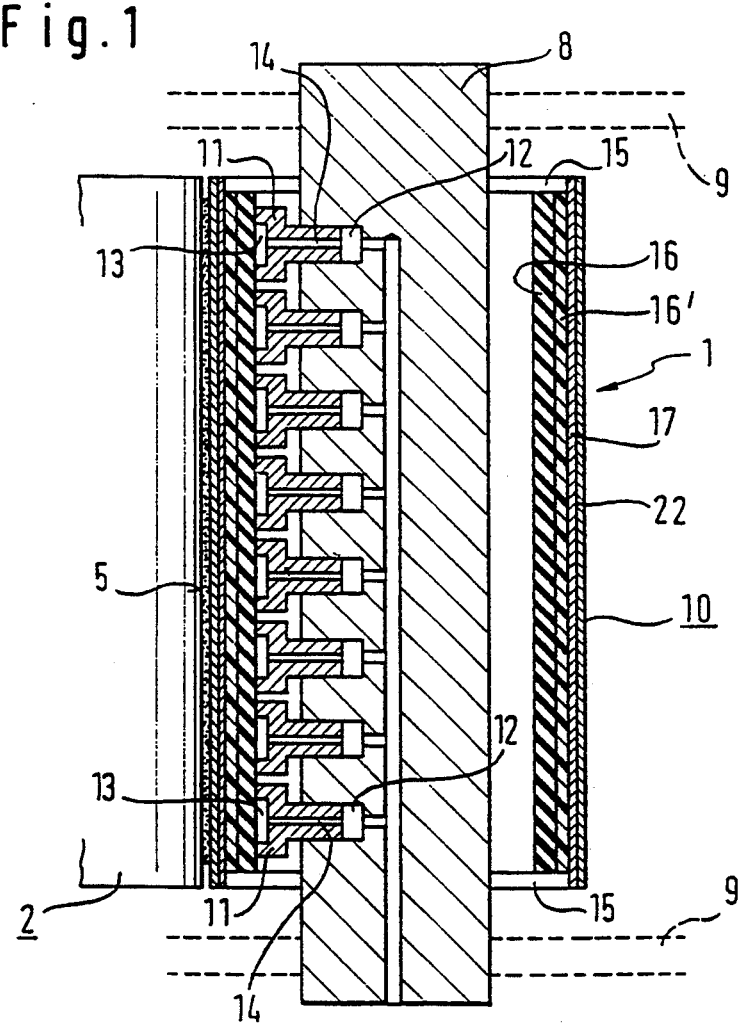
FIG. 1 shows a roll in a horizontal axial section.
Figure 2:
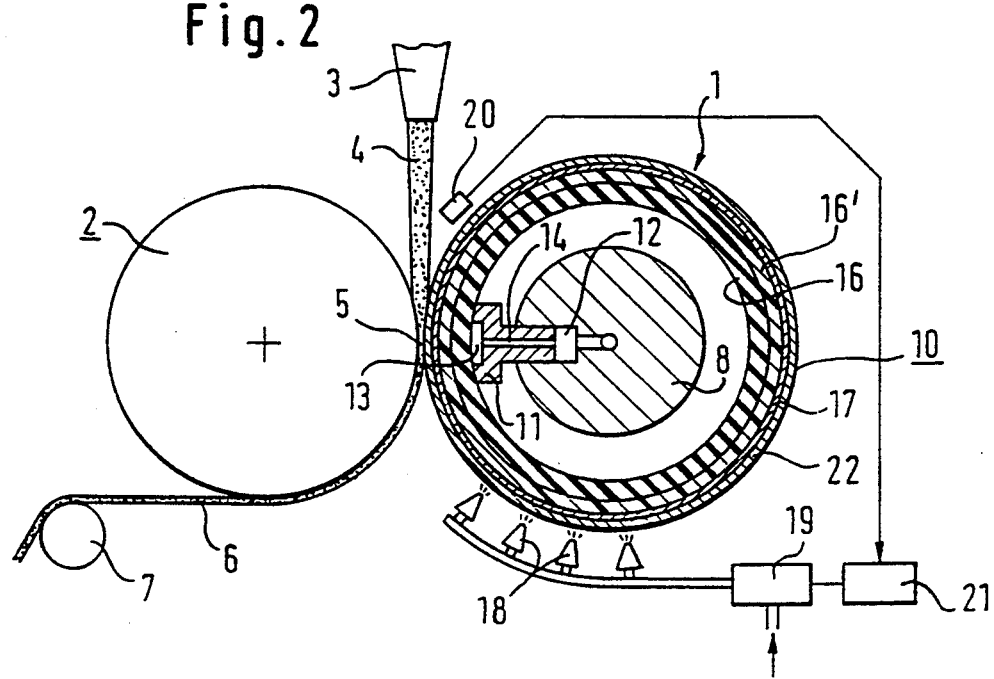
FIG. 2 shows a roll in accordance with FIG. 1 in radial section for use in a foil pouring plant.

In the arrangement shown in the figures, a deflection controlled roll 1 cooperates with a counter-roll 2 which can be formed as a conventional solid or hollow roll or can however likewise be a deflection controlled roll. A flowable plastic mass 4 flows out of an extruder 3 into the gap 5 between the rolls 1 and 2 and solidifies there into a plastic foil 6 which is led away via a deflection roll 7.

The deflection controlled roll 1 has a carrier 8 which is rotationally fixedly mounted in a frame 9 but which is, however, tiltably journalled to a restricted degree, as is for example known in detail from U.S. Pat. No. 3,802,044 or U.S. Pat. No. 3,885,283. A roll jacket 10 is supported relative to the carrier by a row of support elements 11 and is rotatable about the carrier 8. The support elements 11 can be hydrostatic support elements as is known, for example, from U.S. Pat. No. 3,802,044. The support elements 11 are displaceable in the support direction in the carrier 8 in a cylinder guide 12 supplied with hydraulic pressure fluid and have a hydrostatic support surface 13 at their front end which is supplied with hydraulic medium from the cylinder space 12 via restrictor bores 14. This permits a low-friction rotation of the roll jacket 10.

In place of hydrostatically lubricated support elements, one could however also use other forms of support elements, such as known hydrodynamically lubricated support elements, pressure cushions, pressure spaces, electro-magnetic, pneumatic or mechanical support elements.

The support elements 11 can be supplied jointly, group-wise or individually with pressure medium of regulatable pressure. Thus, an individually adjustable pressure can be generated over the width of the gap 5 or of the web of material 4 being treated there and, for example, a desired thickness profile of the plastic foil which is formed on leaving the gap 5. In order to achieve a fine profile control, it is expedient to arrange a plurality of support elements 11 alongside one another and to supply them with pressure medium, the pressure of which is individually regulatable for each support element, or at least for groups of support elements. For a thickness profile regulation of the first order it is, however, under some circumstances sufficient to use a single support element extending over the entire width in the form of a support strip, or a pressure chamber which is supplied via a single line with a pressure medium of regulatable pressure and permits, together with a journalling of the roll jacket 10 on the carrier 8 at the ends of the roll jacket, a profile regulation of the first order, i.e. between the center of the roll and the ends of the roll.

At the ends, the deflection controlled roll 1 is advantageously sealed off by seals 15 which, in known manner, can also be formed to journal the roll jacket 10 on the carrier 8 or to guide the roll jackets-ends in the support direction, as for example described in U.S. Pat. No. 3,885,283.

For the use of the above-described arrangement for the smoothing of a heated paper web or for the treating or pouring of plastic foils with a narrow solidification range of a few degrees Celsius, it is necessary to keep the temperature in the gap between the two rolls 1 and 2 constant with a relatively narrow tolerance of a few degrees Celsius. Only in this way can the desired characteristics of the webs of material formed or treated in the gap 5 be attained or the sudden solidification of the plastic mass with the desired thickness profile be guaranteed.

To achieve this goal, the roll jacket 10 is built up of several concentric layers. As an inner layer a relatively thick layer 16 can be used with rubber-soft elasticity. Beneath this is a layer, which can for example be understood as soft caoutchouc or a material of analogous elasticity, for example a different elastomer with a Shore A hardness between 40 and 95. An inner layer of this kind permits a particularly flexible regulation of the press forces over the whole width and thus an adequately fine profile regulation of the generated plastic foil over the width.

In connection with the treatment of webs of material by cooling or heating, it is particularly advantageous to subdivide the inner zone into two regions, namely a radially outer region and a radially inner region, with the outer region being made harder than the inner region. The radially outer region can, for example, consist of duromer/plastomer with a modulus of elasticity of approximately $10^3$ to $10^4$ N/mm$^2$, whereas the radially inner region can consist of a plastomer/elastomer and have a modulus of elasticity of approximately 10 to $1,5 \times 10^5$ N/mm$^2$. The radially outer region preferably has a lesser radial thickness than the inner region and this outer region can, in accordance with a variant, be fiber reinforced.

Metallic races for the bearing surfaces of the support elements 11 can be provided within the radially innermost region, which ensures precise journalling of the roll jacket, a disturbance-free rotation around the carrier, and also a precise force transmission from the support elements 11 to the roll jacket 10, as is for example known from U.S. Pat. No. 058,877 or U.S. Pat. No. 4,583,273.

The maintenance of a precisely defined temperature in the gap 5 requires special measures. For this purpose, at least one thin layer 17 with a particularly good thermal conductivity is applied to the supportively formed zone 16, 16' of the roll jacket 10. Particularly suitable for this are metallic layers, for example of copper or silver. The thickness of this metallic layer 17 is selected so that the layer can take up an adequate quantity of heat from the plastic composition 4 or from a web of material so that a rapid cooling or heating takes place in the gap 5. As a rule, a layer thickness of at most 1 mm or less is sufficient. In order to regulate the surface temperature of the roll 1 in the gap 5 as accurately as possible to a predetermined value, cooling devices 18 are arranged at the outer side of the roll 1 and extend over at least a part of its periphery. These cooling devices 18 are advantageously formed as fluid nozzles, in particular as gas nozzles which blow a specific cooling gas onto the roll surface and take away again the heat picked up in the gap 5. The gas nozzles 18 are operated by a fan 19 which sucks in air from the environment and directs it via the gas nozzles 18 onto the roll surface. The fan 19 is controlled by a temperature sensor 20 upstream of the inlet of the plastic composition 4 into the gap 5, which senses the temperature of the roll surface shortly before the entry into the gap 5, and so controls the fan 19 via a regulator 21 so that the temperature measured by the sensor 20 corresponds to a predetermined desired value.

In order to avoid adhesion of the solidifying plastic mass to the roll surface and, when required, to generate smoothness, the surface is made particularly smooth or highly polished. This can take place through corresponding selection of the material and treatment of the thermally highly conductive layer, for example by polishing a layer 17 consisting of silver or silver alloy or by applying a very thin further layer, for example of ca. 0.1 mm thickness, onto the thermally highly conductive layer 17, for example by bright chromium plating of the thermally conductive layer 17 consisting of copper.

The counter-roll 2 can be analogously constructed to the deflection controlled roll 1 or can be formed as a solid or hollow roll with a likewise mirror-smooth surface.

In one practical embodiment which satisfies the relevant requirements for a plastic foil pouring plant for polyethylene with a solidification temperature of 60° C., a foil or roll width of ca. 6 meters, and a diameter of the deflection controlled roll of 4 cm, the core zone consisted of 8 cm thickness of soft caoutchouc of Shore A hardness of 62 on the outer side of which there was arranged a 0.2 mm thick layer of copper, the outer surface of which was hard-chromed with a mirror-smooth surface.

The treatment of webs of material can be effected in an analogous manner for which it is important that in the gap 5 in each case only that quantity of heat is transferred from the web of material into the roll surface which ensures the required defined treatment of the web of material. A corresponding statement applies for the case of a required heating of a web of material in which the supply of heat must take place in a very defined manner.

In the case of cooling being required, it is also possible to use an outer cooling roll analogous to German Specification 39 00 294 in place of fluid cooling.

With all kinds of treatment of paper webs in a smoothing calender it is of advantage that the heat storage capacity of the outer zone and the heat pick up or dissipation characteristic of this outer zone is practically not influenced by the inner zone of the roll and thus precise temperature control procedures become possible.

It is of particular advantage to form the outermost layer in the form of a very thin layer with a thickness of up to 0.1 mm, which is for example applied galvanically or by vapor deposition, with a very hard but nevertheless flexible surface being obtained which in no way influences the effectiveness of the deflection controlled roll, but nevertheless ensures ideal temperature regulation in the respective gap, in particular in conjunction with a carrier layer having a high thermal conductivity which is then disposed between this thin layer and the elastic inner zone, which is preferably of multi-layer construction.

What is claimed is:

1. A roll comprising a rotationally fixed carrier, a roll jacket which is rotatable about the carrier, at least one support element for the roll jacket exerting a support force in a pressing plane, the roll jacket including a plurality of concentric zones, the zones comprising a supportively formed inner zone of a resiliently deformable material and at least one non-load carrying outer zone formed of at least two layers having a thermal conductivity and a relatively hard, highly polished outer surface, and a thickness of up to approximately 1 mm.

2. Roll in accordance with claim 1, wherein the inner zone includes an outermost layer comprising a metal.

3. Roll in accordance with claim 2 wherein the metal comprises copper.

4. Roll in accordance with claim 2, wherein at least the outermost layer comprises a galvanically applied layer.

5. Roll in accordance with claim 4, wherein the outermost layer comprises hard chrome.

6. Roll in accordance with claim 1, wherein the inner zone comprises at least two concentric regions, and wherein a radially outer region thereof has a relatively larger modulus of elasticity.

7. Roll in accordance with claim 6, wherein the modulus of elasticity of a radially inner region of the concentric regions is in the range of 10 to $10^3$ N/mm$^2$, the modulus of elasticity of the radially outer region being in the range from about 103 to $1.5 \times 10^5$ N/mm$^2$.

8. Roll in accordance with claim 1, wherein a single layer defines the inner zone and has a Shore A hardness in the range between 40 and 95.

9. Roll in accordance with claim 6, wherein a radial thickness of the outer region is smaller than a radial thickness of an inner region of the concentric regions.

10. Roll in accordance with claim 6, wherein the radially outer region includes a fiber reinforcement.

11. Roll in accordance with claim 1, wherein the inner zone is also formed of at least two layers, the inner and outer zones each comprising an inner layer and an outer layer, and wherein ratios of the hardnesses, moduli of elasticity and layer thicknesses of the inner and outer layers in a radial direction are selected such that for a predetermined magnitude and type of loading the respective outer layer is supported by the corresponding inner layer so that the permissible stress and strain in the relatively harder layer of each zone are not exceeded.

12. Roll in accordance with claim 1, including an outer cooling or heating device extending over at least a portion of a roll surface for maintaining the outer zone at a predetermined temperature.

13. Roll in accordance with claim 12, including a temperature sensor at an inlet side of a roll pair in association with the roll for measuring the surface temperature of an outermost layer of the outer zone, the temperature sensor being operatively coupled with the cooling or heating device so that the temperature at a measured location is maintained at a predetermined temperature.

14. Roll in accordance with claim 1, including cooling or heating gas nozzles arranged to direct a cooling or heating gas onto an outermost surface defined by the outer zone of the roll jacket.

15. Roll in accordance with claim 1, including an outer cooling or heating roll in contact with an outermost portion of the outer zone of the roll jacket for cooling or heating the outermost portion.

16. Roll in accordance with claim 1, wherein the inner zone is constructed of a resiliently deformable material having a relatively low thermal conductivity.

17. Roll in accordance with claim 2 wherein the metal comprises an alloy including at least one of copper and silver.

18. Roll in accordance with claim 2 wherein the metal comprises silver.

19. Roll in accordance with claim 1 wherein at least an outer layer of the outer zone comprises a layer applied by vapor deposition.

20. Roll in accordance with claim 1 wherein an outer layer of the outer zone has a hard and finely profiled surface.

* * * * *